United States Patent
Carter et al.

(10) Patent No.: US 7,743,150 B1
(45) Date of Patent: Jun. 22, 2010

(54) APPARATUS AND METHOD FOR WEB SERVICE MESSAGE CORRELATION

(75) Inventors: Frederick H. Carter, Fremont, CA (US); Steven C. Langley, Walnut Creek, CA (US); Mark T. Wallace, San Rafael, CA (US); Jeffrey T. Meredith, Piedmont, CA (US); Paul E. Butterworth, Alamo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1203 days.

(21) Appl. No.: 10/850,132

(22) Filed: May 19, 2004

(51) Int. Cl.
| | |
|---|---|
| G01R 31/08 | (2006.01) |
| G06F 3/00 | (2006.01) |
| G06F 9/44 | (2006.01) |
| G06F 9/46 | (2006.01) |
| G06F 11/00 | (2006.01) |
| G06F 13/00 | (2006.01) |
| G06F 15/16 | (2006.01) |
| G06F 15/73 | (2006.01) |
| G06F 17/00 | (2006.01) |
| G06F 21/00 | (2006.01) |
| G06N 5/02 | (2006.01) |
| G08C 15/00 | (2006.01) |
| H04B 7/14 | (2006.01) |
| H04H 20/71 | (2008.01) |
| H04J 1/10 | (2006.01) |
| H04J 1/16 | (2006.01) |
| H04J 3/08 | (2006.01) |
| H04J 3/14 | (2006.01) |
| H04J 3/24 | (2006.01) |
| H04L 1/00 | (2006.01) |
| H04L 12/26 | (2006.01) |
| H04L 29/06 | (2006.01) |
| H04M 1/24 | (2006.01) |
| H04M 3/00 | (2006.01) |
| H04M 3/22 | (2006.01) |

(52) U.S. Cl. .................. 709/227; 370/241; 370/312; 370/315; 370/349; 379/32.01; 706/47; 709/202; 709/203; 709/206; 709/219; 709/223; 709/224; 709/228; 709/246; 713/185; 714/47; 718/101; 719/311; 719/317; 719/328; 726/1

(58) Field of Classification Search ............... 709/227, 709/202, 203, 206, 219, 223, 224, 228, 246; 370/241, 312, 315, 349; 379/32.01; 706/47; 713/185; 714/47; 718/101; 719/311, 317, 719/328; 726/1
See application file for complete search history.

(56) References Cited

U.S. PATENT DOCUMENTS 5,367,635 A * 11/1994 Bauer et al.

(Continued)

*Primary Examiner*—George C. Neurauter, Jr.
*Assistant Examiner*—Daniel C Murray
(74) *Attorney, Agent, or Firm*—Townsend and Townsend and Crew LLP

(57) ABSTRACT

In one embodiment, a method for correlating web service messages includes operating an autonomous software agent. This agent can detect a correlation key of a message, and then associate the message with the detected correlation key while a transaction is pending. During the transaction, the message can be accessed to retrieve information. In another embodiment, the method includes further operating said autonomous software agent to acquire a subset of rules governing execution of the transaction. The agent can be configured to intercept a noncompliant message associated with the correlation key. If it does, the agent can modify the noncompliant message to comply the said subset of rules.

5 Claims, 12 Drawing Sheets

U.S. PATENT DOCUMENTS

| | | | |
|---|---|---|---|
| 5,386,412 A * | 1/1995 | Park et al. | 370/270 |
| 5,404,523 A * | 4/1995 | DellaFera et al. | |
| 5,615,351 A * | 3/1997 | Loeb | 700/90 |
| 5,655,081 A * | 8/1997 | Bonnell et al. | |
| 5,710,918 A * | 1/1998 | Lagarde et al. | |
| 5,751,914 A * | 5/1998 | Coley et al. | |
| 5,761,502 A * | 6/1998 | Jacobs | |
| 5,761,673 A * | 6/1998 | Bookman et al. | |
| 6,317,786 B1 * | 11/2001 | Yamane et al. | 709/224 |
| 6,519,636 B2 * | 2/2003 | Engel et al. | |
| 6,549,952 B1 * | 4/2003 | Plassmann et al. | |
| 6,563,813 B1 * | 5/2003 | Coveley | 370/349 |
| 6,766,368 B1 * | 7/2004 | Jakobson et al. | |
| 6,862,698 B1 * | 3/2005 | Shyu | 714/57 |
| 6,928,471 B2 * | 8/2005 | Pabari et al. | 709/223 |
| 6,928,556 B2 * | 8/2005 | Black et al. | 726/6 |
| 6,941,557 B1 * | 9/2005 | Jakobson et al. | 719/316 |
| 7,035,903 B1 * | 4/2006 | Baldonado | 709/206 |
| 7,275,250 B1 * | 9/2007 | Novik et al. | 719/318 |
| 7,284,048 B2 * | 10/2007 | Jakobson et al. | 709/224 |
| 7,318,093 B2 * | 1/2008 | Touboul | 709/223 |
| 7,475,150 B2 * | 1/2009 | Grabarnik et al. | 709/228 |
| 2003/0061404 A1 * | 3/2003 | Atwal et al. | |
| 2003/0161446 A1 * | 8/2003 | Dammrose | 379/32.01 |
| 2003/0233477 A1 * | 12/2003 | Ballinger et al. | |
| 2004/0027999 A1 * | 2/2004 | Casaccia et al. | 370/312 |
| 2004/0133656 A1 | 7/2004 | Butterworth et al. | |
| 2004/0228360 A1 * | 11/2004 | Bae et al. | 370/432 |
| 2005/0166099 A1 * | 7/2005 | Shyu | 714/47 |
| 2005/0193097 A1 * | 9/2005 | Guthrie et al. | |
| 2005/0195745 A1 * | 9/2005 | Scott et al. | 370/241 |
| 2005/0210393 A1 * | 9/2005 | Maeng | 715/751 |
| 2006/0013177 A1 * | 1/2006 | Saito | 370/338 |
| 2006/0053477 A1 * | 3/2006 | Grabarnik et al. | 726/1 |
| 2006/0215593 A1 * | 9/2006 | Wang et al. | 370/315 |
| 2006/0242292 A1 * | 10/2006 | Carter | 709/224 |
| 2007/0150585 A1 * | 6/2007 | Chkodrov | 709/224 |
| 2007/0294387 A1 * | 12/2007 | Martin | 709/224 |
| 2008/0294740 A1 * | 11/2008 | Grabarnik et al. | 709/206 |
| 2009/0150498 A1 * | 6/2009 | Branda et al. | 709/206 |

* cited by examiner

APPARATUS AND METHOD FOR WEB SERVICE MESSAGE CORRELATION

BRIEF DESCRIPTION OF THE INVENTION

This invention relates generally to web services. More particularly, this invention relates to one or more autonomous agents that inspect web service messages and correlate the content as well as the context of those messages to form a pool of information. This pool is accessible during a web service transaction and may be used to modify a web service message before leaving the agent.

BACKGROUND OF THE INVENTION

A web service is a software vehicle that accepts requests from a client to perform operations. At this time, these requests are typically in the form of Extensible Markup Language (XML). Although XML is used as an example, other forms of invocation are also possible. In most cases, a web service returns a response after processing the request. Web services typically operate independently of a specific computer language, platform, or location. Therefore, a client can contact a web service that is written in a different programming language, which is running on a different platform, and is located across a network.

Because web services can contact each other to request the execution of operations, they serve as building blocks for distributed systems. Distributed systems composed of web services may span multiple machines, a corporate intranet, or the Internet. Combining web services from a base environment with web services outside the base environment, such as those operated by partners or suppliers, can enable complex applications to perform sophisticated business activities. Accompanying this complexity, however, is an increased difficulty in detecting and resolving errors in the large number of messages used to support such business activities.

A common message type used to transact web services is based on SOAP (Simple Object Access Protocol). SOAP is a protocol specification that defines a uniform way of passing XML-encoded data. SOAP also defines a way to perform remote procedure calls using HTTP (or another transport protocol) as the underlying communication protocol. A client sends a SOAP request message to the web service, and receives a SOAP response message in return. Using SOAP, the service requestor and the service provider can communicate as long as they agree on a common transport protocol (such as HTTP) and the message's SOAP definition. This increases the opportunities for reuse, as the service places essentially no constraints on the platform, language, or location of its clients. But even with the flexibility of using such messages, monitoring, managing, and controlling web service systems and transactions can be difficult.

In particular, any one of the large number of web service messages used to transact web services can include an error that is difficult both to detect and to resolve. Anomalies in web services transactions are generally more difficult to detect unless viewed in a context, such as over a set of messages. And without a mechanism to detect such errors, deficient messages can lead to failed business transactions, lower customer satisfaction, lost orders, and lost revenue. Typically, the keys to resolving such errors lie within the messages themselves. That is, a group of messages required to transact a specific web service generally will contain information that can be used to rehabilitate a defective message. But at present, there are no satisfactory techniques for correlating that information so that it can be harvested for real-time error correction or message modification.

In view of the foregoing, it would be desirable to provide a mechanism for enhancing the functionality of existing web services. Ideally, the technique would provide enhanced functionality to effectively identify and relate web service messages so as to detect, report and correct message errors before deficient messages are sent. By correlating web service messages, self-healing web service transactions can be realized.

SUMMARY OF THE INVENTION

The present invention includes a method for correlating web service messages. The method uses an autonomous software agent to detect a correlation key of a message. The agent is configured to associate the message with the correlation key during a transaction. While the transaction is pending, the contents of the message can be accessed. In some embodiments, the method includes operating the autonomous software agent to acquire a subset of rules that governs execution of the transaction. The agent can be configured to intercept a noncompliant message associated with the correlation key, and if it does, the agent can modify the noncompliant message to comply with the subset of rules.

In another embodiment of the present invention, an exemplary method for performing a transaction uses at least one web service. This method includes operating an autonomous software agent to identify a group of correlated messages. The agent is configured to intercept a message that requires information to complete the transaction, and then modify the message to include the information. In some embodiments, the agent can further associate a first plurality of messages with a first correlation key, and a second plurality of messages with a second correlation key. Then, the agent can link the first and the second plurality of messages such that the contents of both of the first and the second plurality of messages form a pool of information.

This pool of information is a rich reservoir of message-related data that can be drawn upon not only to detect and correct deficient messages but also to determine whether one or more messages are suitable in the context of other messages. So in forming such a pool of information, not only do some embodiments correlate messages based on their contents, but also various embodiments can correlate messages based on the context in which the message was sent (e.g., by whom, other user-identifying information, time when sent, destination, etc.). By correlating messages in terms of both their contents and their context, an exemplary system and method of the present invention is effective in detecting, diagnosing and resolving message errors before such message reach a web service.

The present invention provides techniques for performing web services transactions in a self-healing manner. In particular, web service messages and their contents can be correlated and indexed for expeditious retrieval of information. This information can be used to quickly detect exceptions to normal web service operations before those exceptions can negatively affect the web service. One or more autonomous agents detect and resolve errors in a manner that corporate cost and customer inconvenience are decreased due to faster diagnosis and resolution of such exceptions. Also, there are fewer failed transactions that would otherwise consume resource and capital to resolve. Lastly, customer satisfaction is improved with minimized disruptions in the web service.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
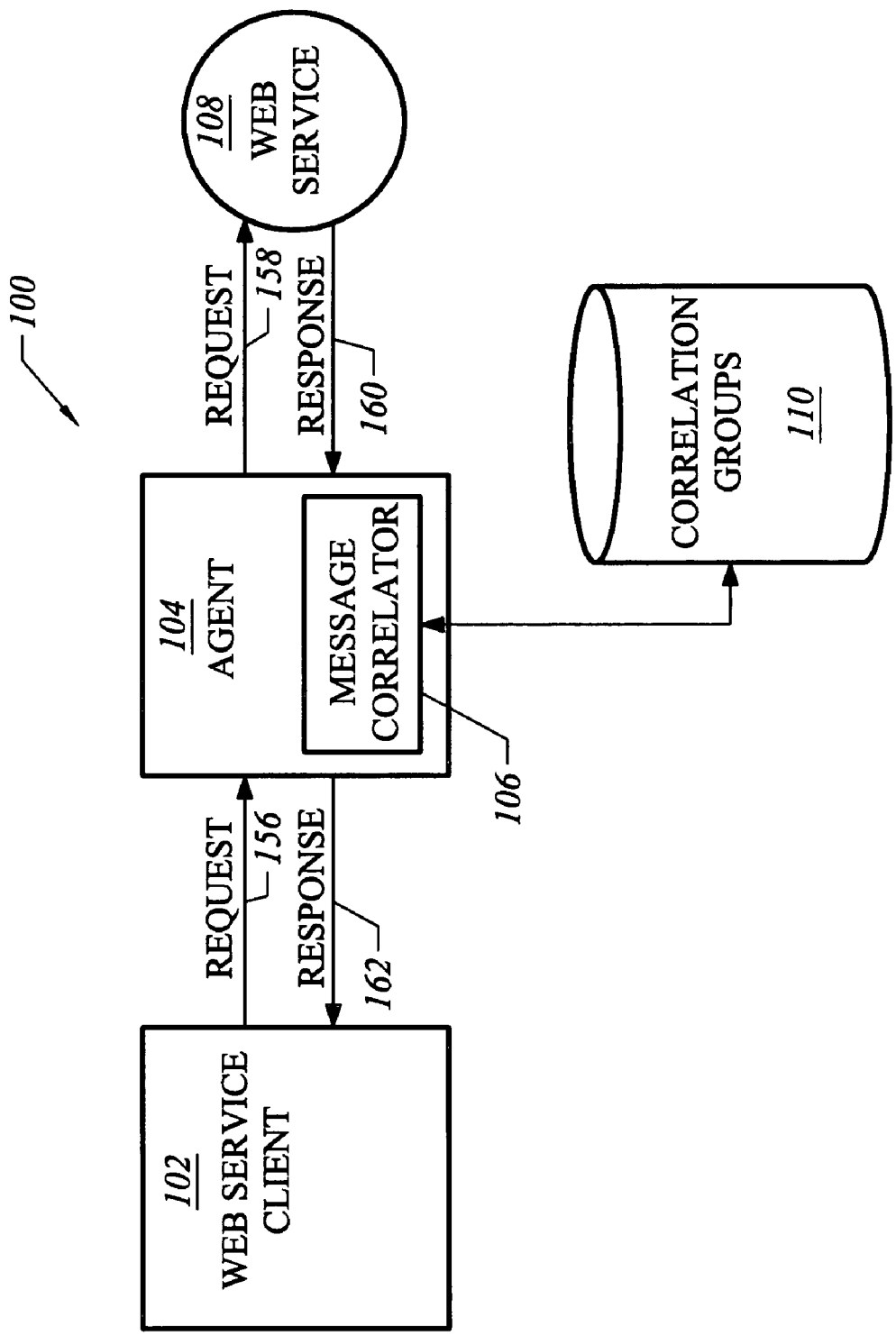
FIG. 1 illustrates a web service architecture configured to operate in accordance with an embodiment of the invention.

FIG. 1 illustrates a web service architecture 100 configured in accordance with an embodiment of the invention. Web service architecture 100 includes a web service client 102 and a web service 108, both of which are coupled via an agent 104 to exchange messages. Agent 104 can reside anywhere between web service client 102 and web service 108, and operates to intercept web service messages (e.g., an XML request) as it is communicated via path 156. After agent 104 processes the intercepted message, the message can be routed to web service 108 via path 158. The processing at web service 108 is performed in a standard manner, without alteration by the agent 104 (i.e., without altering the underlying code of the web service). Web service 108 applies its output via path 160 to agent 104. After agent 104 processes the information of the message sent from web server 108, agent 104 communicates its output via path 162 to web service client 102.

In operation, agent 104 can be configured to examine and to modify the contents of messages, to reroute messages, and to analyze the context of messages, among other things. The context of a message generally includes things like: the message being processed; information about the message, such as the operation name, the time it arrived, the user invoking the operation; the transaction name; and any other like information describing the environs in which the message is processed. To illustrate, consider that a message is sent to a web service requesting the purchase of "1,000,000 heavy-duty tractors." On its face, this message and its contents can be considered valid; that is a web service likely can execute such a purchase request. Next, consider that such a message will be "out of context" if the person placing the order is unauthorized, or otherwise lacks capacity to be bound to such a purchase contract. For example, if the person requesting such a purchase was under 13 years old, then that order can be ignored. Or, an action can be taken in response to such an event, such as notifying the person that the order cannot be processed. So, when gauging the validity of a particular message, information from other related messages provides the context to do so.

Accordingly, agent 104 is configured to respond to different events, such as the receipt of a message or the changing value or state of a variable within the message, by executing instructions called actions. An action instructs agent 104 to perform a unit of processing as either an operation or a transaction, or both. A suitable agent for implementing agent 104, according to a specific embodiment of the present invention, is described in U.S. patent application Ser. No. 10/201,617 filed on Jul. 22, 2002, titled "Apparatus and Method for Content and Context Processing of Web Service Traffic," which is incorporated by reference in its entirety, for all purposes.

As is shown in FIG. 1, agent 104 includes a message correlator 106 coupled to memory 110, which can be composed of a database, memory chips, etc. Message correlator 106 operates to relate messages independently exchanged between web service client 102 and web service 108. Memory 110, which is coupled to message correlator 106, functions to store related web service messages as correlated groups. Although memory 110 is shown external to agent 104, memory 110 can also reside, in whole or in part, within agent 104 in some embodiments. According to one embodiment, a message that performs a particular web service activity, such as a discrete unit of processing of an operation or a transaction, can be correlated with other messages that perform the same web service activity. As agent 104 receives messages, each one of those messages is inspected, and if applicable, is related to other messages that previously have been correlated to the same web service activity. These correlated messages form a correlated group as a pool of information. With this pool, relevant information can be identified and then extracted to supplement, add, replace, or otherwise modify a deficient message that is a member of the same correlated group.

A deficient message can be deficient either in its content or in its context. A message having deficient content generally contains an error, such as incorrect or absent information, such that if processed by a web service, that message would result in improper operation. This type of deficient message is considered invalid. By contrast, a message that is deficient in its context does not necessarily have incorrect or absent content when examined alone, but rather it is deficient in comparison with other messages associated with a common correlation group. One example of the latter type of deficient message is a message generated by a person authorized to use a specific line of credit to purchase only cars, but not trucks. If a particular message contains information specifying the type of vehicle as a "pick-up," without any other incorrect or absent information, then this message is valid. That is, it can be processed by the web service. But in context with another message that specified the line of credit to be used, the combined messages would be deficient. To correct the deficiency of either content or context, agent 104 can modify a deficient message so as to change the behavior of the processing of the web service. For example, agent 104 can substitute content specifying an alternate line of credit if correlated messages or other services indicate that such an option is available. Alternatively, agent 104 might send a message back to the customer informing them of their authorization restrictions.

In one embodiment, web service 108 is a SOAP ("Simple Object Access Protocol") web service that can be defined as a set of operations, each operation consisting of one or more SOAP messages, such as a Request message, a Response Message, or a Fault message. SOAP is a well-known protocol specification that defines a uniform way of passing, for example, XML-encoded data. One or more operations generally constitute a transaction as a higher-level web service activity. To effectuate a transaction, multiple operations are performed to support that transaction. For example, consider the purchase of a product as a transaction. Operations such as "place the order," "check credit," "check inventory," "create bill," "ship product," etc., each comprise a set of messages, that when taken as a whole, perform the overarching transaction of "purchasing of the product." The term transaction is not intended to imply a restriction to only commercial activity, but rather should be understood to connote any process that can be implemented as a web service.

Further to the example, message correlator 106 functions to relate groups of messages (e.g., SOAP messages) that otherwise would be treated as standalone events, independent of messages of other operations of the same transaction. Thus, message correlator 106 enables messages for performing the "place the order" operation to be linked to messages of the other operations, such as those messages for performing the "ship product" operation. After the messages of both the "place the order" and the "ship product" operations have been linked, the messages and their relationships are stored as a correlation group in memory 110.

Message correlator 106 links groups of messages according to information contained in, or otherwise associated with each message. In one embodiment, each message that corresponds to a particular operation is identifiable by one or more fields of information common to those messages of that operation. For example, the messages of both the "place the order" and the "ship product" operations might contain a common field, such as an "order number" field. Further, this common field might contain the same value (e.g., an alphanumeric number, such as 1234-ABCD) across each of the messages of those two operations. If so, then message correlator 106 can form associations between the messages of both operations. Moreover, the common field, such as the "order number" field, can be used to relate messages of other operations that have yet to be received by agent 104. According to a specific embodiment, message correlator 106 correlates SOAP messages by using an element of an XML document that constitutes each of the messages.

Figure 2:
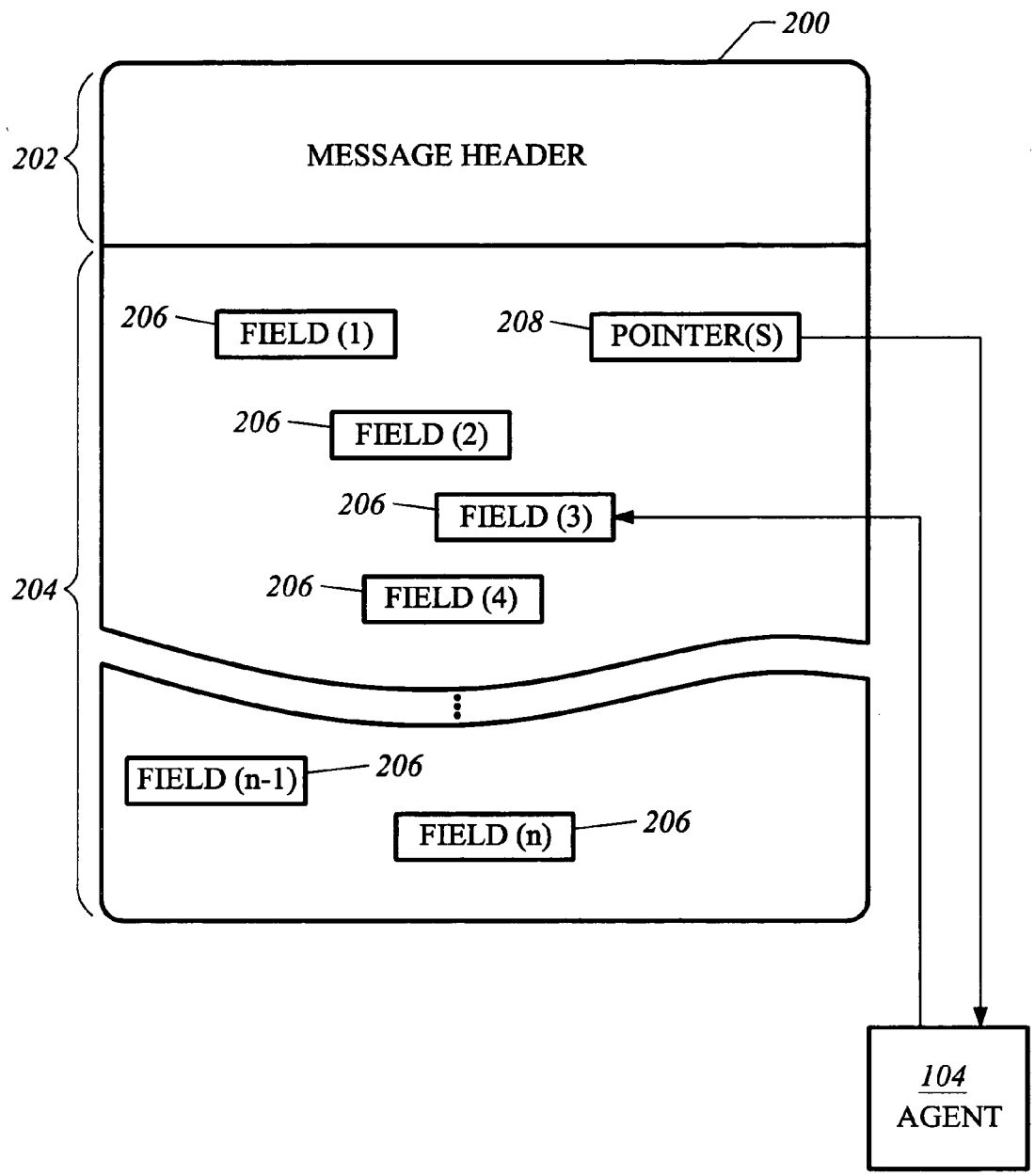
FIG. 2 is a conceptual representation of message elements that are used to correlate messages in accordance with an embodiment of the present invention.

FIG. 2 is a conceptual representation of message elements that are used to correlate messages in accordance with an embodiment of the present invention. An exemplary message 200 includes a message header 202, which is optional, and a message body 204. Message header 200 typically includes information for routing, security, and other communications-related data, whereas message body 204 includes the payload, which includes information for processing web service operations. At least some of the information of message body 204 is contained within fields 206, such as Field (1), Field (2), Field (3), . . . and Field (n). When a field 206 contains information that can be used by agent 104 to correlate message 200 to other similar messages (not shown), that field 206 is referred to as a correlation field, and the information contained therein is referred to as a correlation key. In some instances, field 206 as well as other fields can include two or more correlation keys, each of which associate message 200 to multiple groups of correlated messages. Optionally, any field 206 can also include either an operation identifier ("ID") or a transaction ID, or both. The operation ID and the transaction ID include information that represents the operation (e.g., "place the order" operation) and the transaction, respectively, with which message 200 is associated. These IDs can be used for message correlation according to the present invention.

Message 200 can also include one or more pointers 208, each of which describes the location of a correlation field. By using pointer 208, agent 104 can locate which field 206 is a correlation field when extracting a correlation key. As shown in FIG. 2, pointer 208 indicates that Field(3) is a correlation field, as determined by agent 104. In one embodiment, locations of correlation fields are encoded in an XPath expression, which is a well-known language for addressing parts of an XML document. So by locating correlation fields of message 200, message correlator 106 of FIG. 1 can extract correlation keys to relate and form groups of correlates messages.

Figure 3:
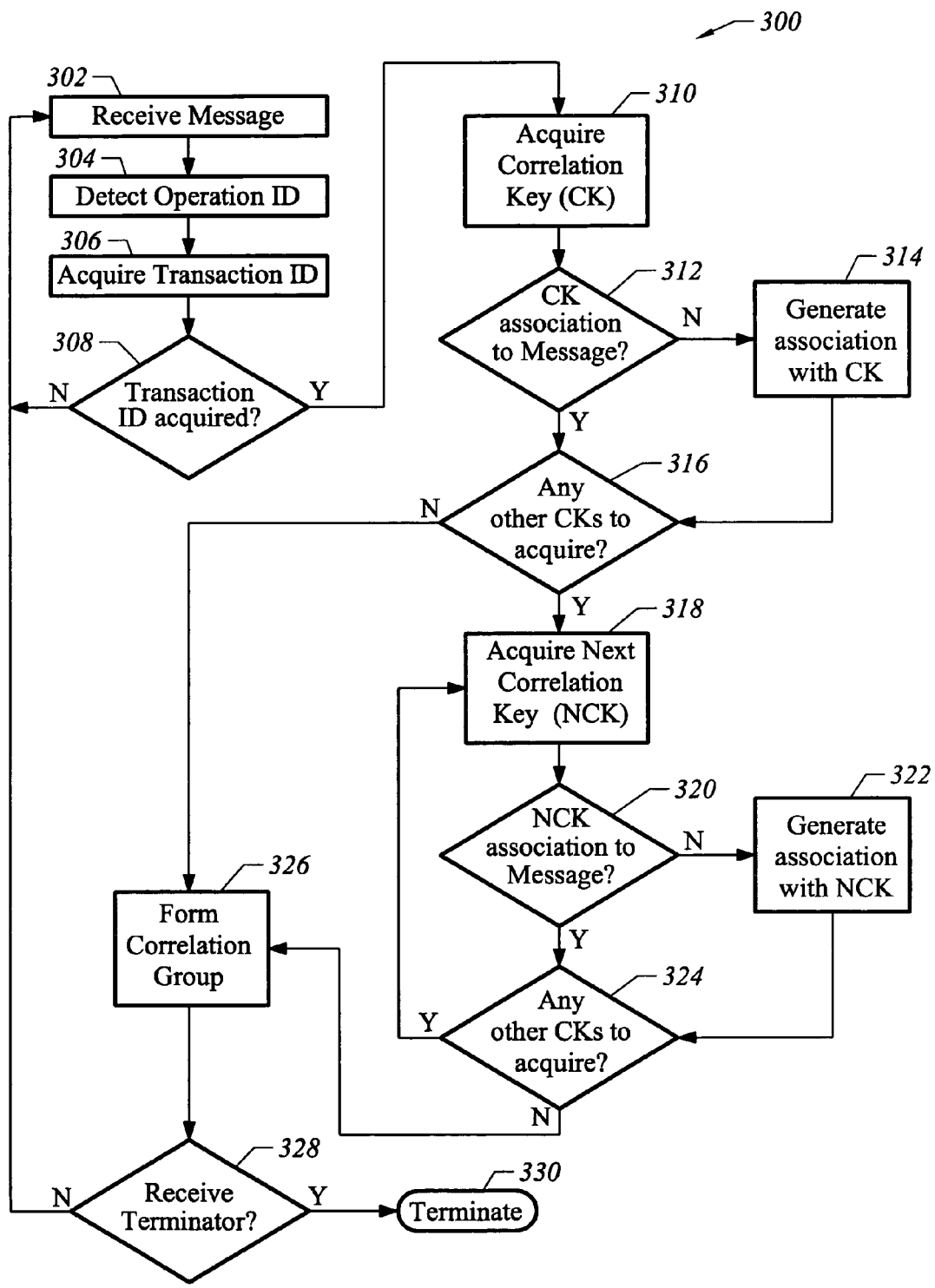
FIG. 3 is an exemplary flow diagram depicting a method of correlating messages in accordance with one embodiment of the present invention.

FIG. 3 is an exemplary flow diagram depicting a method for correlating messages in accordance with one embodiment of the present invention. An exemplary message correlator 106 of FIG. 1, in whole or in part, can correlate messages according to flow 300. In other instances, agent 104 can also perform any number of portions of flow 300. Regardless, the correlation of a message begins at 302, when a message is received into agent 104. After arriving at agent 104, each message is examined at 304 to detect an operation ID, such as SubmitOrder for a "submit order" operation. Similarly, each message is inspected at 306 to acquire a transaction ID, such as OPS for an "order processing system" transaction. If a transaction ID is determined to be available for the message at 308, then flow 300 continues to block 310. The availability of a transaction ID implies that at least one correlation key exists for the received message. But if no transaction ID is found at 308, then the message cannot be correlated and flow 300 returns to block 302. In some embodiments, block 308 tests whether an operation ID is present instead of, or in addition to, the transaction ID.

At block 310, message correlator 106 acquires a correlation key ("CK") by first locating the correlation field containing the key, and then extracting information constituting the correlation key. At 312, message correlator 106 determines whether an identical correlation key with which to associate the message is stored in memory 110. The discovery that the same correlation key is stored in memory 110 indicates that other messages containing the same correlation key have already been received prior to the arrival of the message received at 302. Prior to 302, those other messages each have been stored in memory 110 and indexed by the correlation key itself, thus forming a correlation group. So at 312, the message received at 302 will be also stored in memory 110 in association with the same correlation key, thereby linking the received message (and its contents and context) to the other messages (and their cumulative contents and contexts) having the same correlation key. After the message has been stored using the discovered correlation key at 312, flow 300 then continues to 316.

In some embodiments, message correlator 106 of FIG. 1 can operate to verify whether the message received at 302 is also associated with an operation ID and/or a transaction ID that are stored in memory 110. If any one or more associations for the correlation key, the transaction ID, and the operation ID is not discovered in memory 110, then message correlator 106 can operate to generate a data structure for storing either messages or associations, or both at 314. For example, if previously unobserved transaction ID is acquired at 308, then at 312 message correlator will form a data structure in which to store the transaction ID in association with the correlation key. One might expect this to occur frequently when a transaction, such as ordering a book via a web service, has just commenced. That is, the messages for that transaction have yet to be received by agent 104. After message correlator forms and stores associations at 314, flow 300 continues to 316.

But if any prior message included the same operation ID or transaction ID, then those IDs would be associated with the correlation key stored in memory 110, under which those prior messages would be categorized. For example, if a correlation key "order number" is stored in memory 110, and associated with a transaction ID of "order processing," then any later arriving message having that same correlation key will be associated with the "order processing" transaction. Likewise, if the stored "order number" correlation key is associated with an operation ID, such as "SubmitOrder," then the message received at 302 can be associated with that same operation ID when stored in 110, so long as the message includes the same operation ID.

At 316, the message received at 302 is examined further to determine whether any additional correlation keys are to be acquired as next correlation keys ("NCKs"). If so, blocks 318-324 are repeated in a similar fashion as blocks 312-316. But if message correlator 106 determines at either 316 or 324 that no other correlation keys are contained within the received message, then flow 300 continues to block 326.

At 326, a correlation group is formed. A correlation group is a collection of related messages that are linked by one or more correlation keys. This collection of messages forms a pool of information that can be used to access the contents of the related messages. By correlating related messages, a message deemed deficient can be rehabilitated by modifying that message to include information from another message. As explained above, a deficient message can be deficient in either content or context. Regardless of the deficiency, if agent 104 determines that a received message lacks information, such as an improper credit card number (or that it is otherwise improper in context), then agent 104 can examine the correlation group to retrieve that information, if available, from the pool of information. Further, a correlation group can also be used to monitor and report on the status of transactions instantaneously, with agent 104 providing information for reporting web service transactions in real-time.

At 326, a correlation group can be formed by adding each newly received message to an existing group indexed by the same correlation key. While agent 104 receives more messages with at least one of the keys being the same key common to that correlation group, those additional messages are included in the existing correlation group. A single message having multiple correlation keys generally can be associated with more than one correlation group. In some cases, a single message might form a specific correlation group, at least until other messages with the same correlation key are observed.

Further, correlation groups can be formed by linking correlation groups of smaller quantities of messages to form a larger pool of information. For example, consider that before a particular message is received at 302, memory 110 contains two correlation groups, each formed by including messages having only one of two different correlation keys (e.g., one correlation group is associated with correlation key "Employee_ID," and the other is associated with correlation key "Social_Security_Number"). But when a message that contains both correlation keys is received at 302, message correlator 106 forms associations by performing 310 to 324 of FIG. 3. With two correlation keys, this message provides a "bridge" with which to link both of the correlation groups that otherwise were unrelated until the receipt of this message. A message that contains multiple correlation keys for linking collections of messages is referred to as a "bridge" message. Bridge messages are discussed below in connection with FIGS. 7A-7D.

After the correlation group has been formed or supplemented at 326, flow 300 continues to 328. At 328, message correlator 106 determines whether the received message includes a terminator, which is data that signals the conclusion of the transaction. With the transaction finished, the correlation group associated with the transaction ID is no longer required, and message correlator 106 will deallocate the portion of memory 110 containing that particular correlation group. While no terminator is received for messages of a specific transaction ID, flow 300 continues to 302 to examine additional messages. But when a terminator is received at 328, the correlation group is terminated at 330.

Figure 4A:
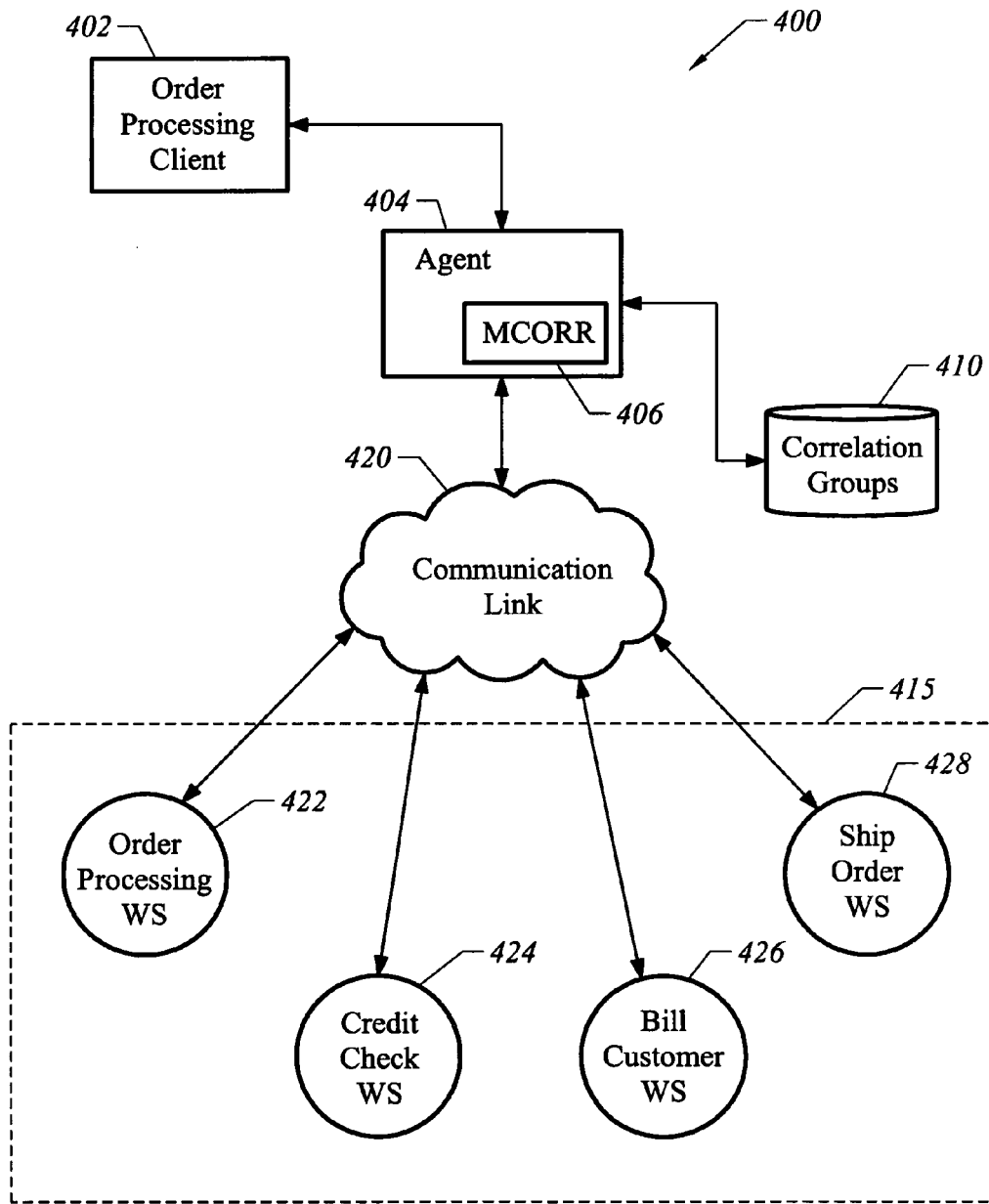
FIG. 4A is a diagram of an exemplary web service architecture in accordance with another embodiment of the present invention.

FIG. 4A is a diagram of an exemplary web service architecture in accordance with another embodiment of the present invention. In this example, web architecture 400 is an order processing system for facilitating the purchase of books online. Web service client 102 of FIG. 1 is configured as an order-processing ("OP") client 402 to initiate, among other things, an OP transaction. Agent 404, message correlator ("MCORR") 406 and memory 410 can be equivalent in functionality and structure as those similarly described in FIG. 1, but are configured to also facilitate the OP transaction supported by web service architecture 400. Agent 404 is coupled via a communications link 420 (e.g., a network, a bus, or any other conduit for exchanging messages) to web services 415, such as Order Processing web service ("WS") 422, Credit Check WS 424, Bill Customer WS 426, and Ship Order WS 428. Web services 415 perform individual web services corresponding to their individual names. Although web services 415 can send and receive XML message in the SOAP format, other protocols can be implemented (e.g., non-SOAP XML, etc.).

Figure 4B:
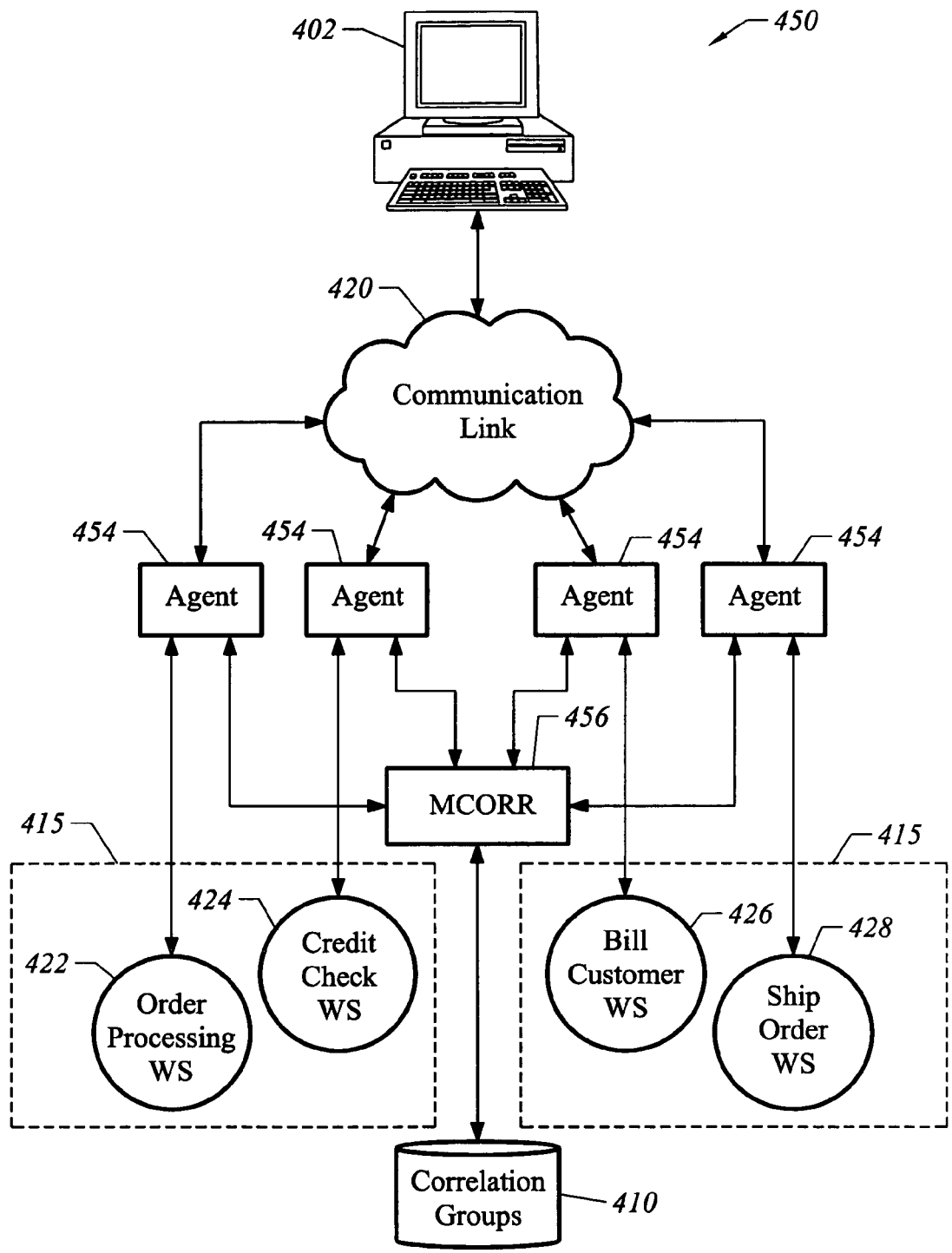
FIG. 4B is a diagram of another exemplary web service architecture including one or more distributed agents in accordance with a specific embodiment of the present invention.

In a specific embodiment, the functionality of agent 404 can be distributed anywhere in web service architecture 400. As such, an agent can be disposed between communication link 420 and one or more web services 415 as shown in FIG. 4B, which is discussed below. For example, agents 404 can be disposed between communications link 420 and each of Order Processing web service ("WS") 422, Credit Check WS 424, Bill Customer WS 426, and Ship Order WS 428. In some embodiments, client 402 is a client computer system, whereas web services 415 can include one or more computing devices, such as servers. In some cases, agent 404 is a dedicated computing device (e.g., a dedicated server, such as an application server, web server, proxy server, etc.), whereas in other cases agent 404 can be disposed of client 402 and/or a server hosting any of web services 415. In other cases, web services 415 can be deployed as one or more servers.

FIG. 4B illustrates another exemplary web service architecture 450 in accordance with a specific embodiment of the present invention. Agents 454, which each can be similar to that of each of agents 404 of FIG. 4A, are disposed between communications link 420 and each of web services 415. But as shown, the functionality and structure of MCORR 456 in FIG. 4B is separate from, but common to agents 454. In this configuration, each agent 454 receives and inspects message traffic relating to a specific web service (e.g., Order Processing WS 422, Credit Check WS 424, Bill Customer WS 426, and Ship Order WS 428). Each of agents 454 can also receive messages that are not particularly relevant to the messages of correlation groups 410. In most cases, these irrelevant messages are processed by the agents without affecting the correlation groups 410.

In operation, MCORR 456 accesses correlation group 410 to acquire information contained within correlation group 410 as any of web services 415 processes transactions, in whole or in part. In some instances, a correlation key identifies that information. Regardless, MCORR 456 instructs one or more agents 454 to intercept messages that are relevant to one or more correlation groups 410 of interest, such as during a specific transaction. In the case where one of agents 454 intercepts a message, that agent can relay the intercepted message, as well as its contents and context, to MCORR 456. In turn, MCORR 456 builds (or augments) information constituting correlation groups 410, and provides that information to one or more other agents 454 requiring it. For example, MCORR 456 can instruct the agent coupled to Order Processing WS 422 to provide content, such as a credit card number, to MCORR 456. Then this information can be either added to correlation groups 410 or forwarded to the agent coupled to Credit Check WS 424, or both. If forwarded to the agent coupled to Credit Check WS 424, then that agent can replace an improper credit card number, if so received, by the number obtained from the agent coupled to Order Processing WS 422 via MCORR 456. Examples of how message correlators 406 and 456 perform message correlation in accordance with some embodiments of the present invention are described in FIGS. 5-7D as follows.

Figure 5:
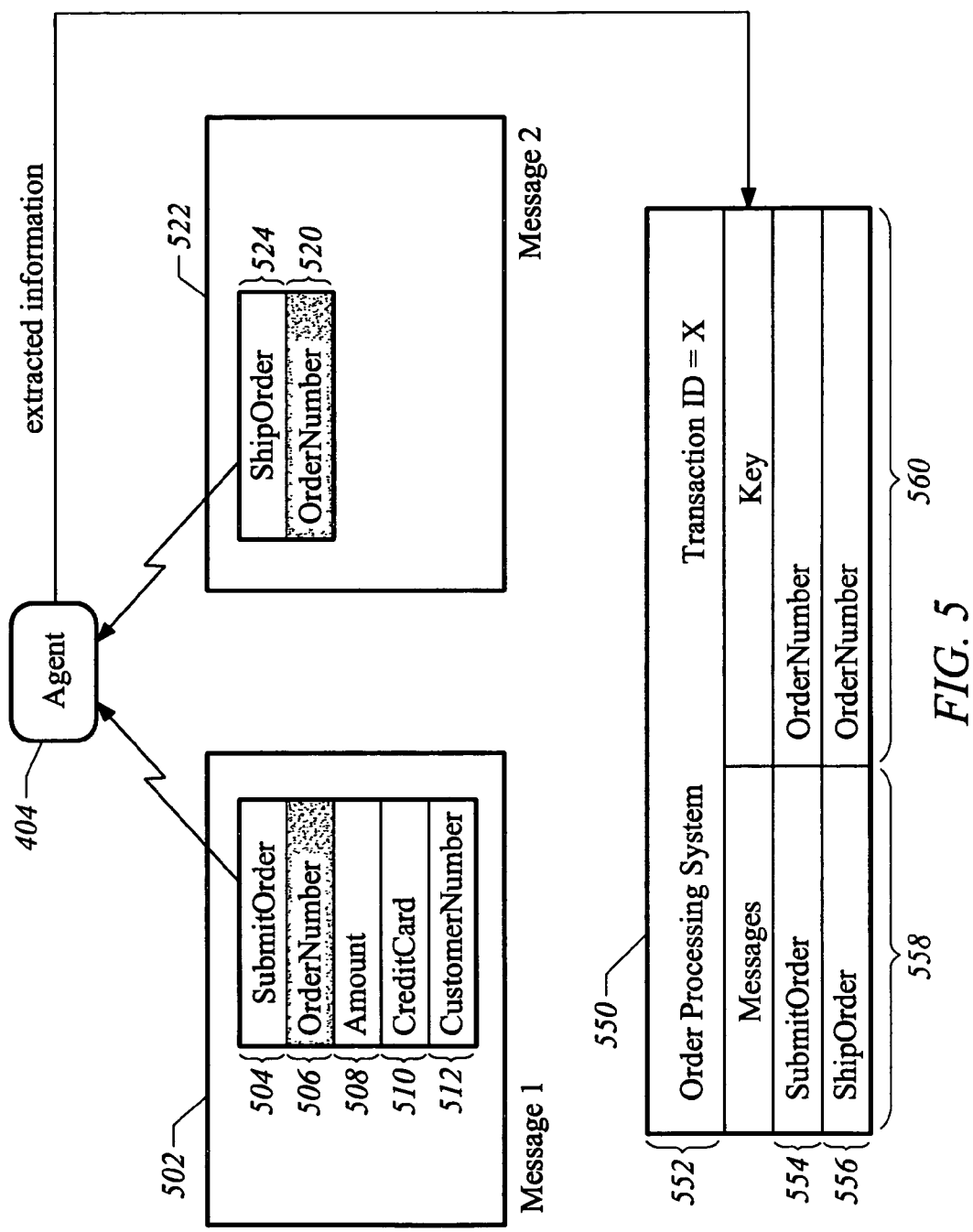
FIG. 5 illustrates an exemplary agent configured to examine and correlate messages, according to an embodiment of the present invention.

FIG. 5 illustrates an exemplary agent configured to examine and correlate messages having a single correlation, according to an embodiment of the present invention. Further to the example described in FIG. 4A, consider that a customer activates a web browser of OP client 402 to purchase a book on-line. The order processing system of FIG. 4A uses two messages to effectuate an OP transaction, specifically message (1) 502 and message (2) 522. Agent 404 operates to inspect these messages to at least correlate them. Message (1) 502 includes information for starting the OP transaction, such as the customer number, billing information, a description of the items being purchased, and the like. As shown, message (1) 502 includes "SubmitOrder" as operation ID 504 and fields 506 to 512. Namely, fields 506, 508, 510 and 512 contain information describing an order number, an amount, a credit card number, and a customer number, respectively. In this instance, the message correlator (not shown) of agent 404 determines that field 506 contains the single correlation key (i.e., shown as the shaded field) for this message. Typically in this OP transaction, the web browser generates and sends message (1) 502 to Order Processing WS 422 of FIG. 4A.

Message (2) 522 includes information for shipping the OP transaction, such as the order number. As shown, message (2) 522 includes "ShipOrder" as operation ID 524 and a field 520, which contains information describing the order number. In this case, the message correlator also determines that field 520 contains a single correlation key (i.e., shown as the shaded field) for this message. In this OP transaction, Order Processing WS 422 processes message (1) 502 and then provides a response to agent 404. In turn, agent 404 generates and sends message (2) 522 to Ship Order WS 428, which causes a warehouse to ship the product to the customer.

In operation, agent 404 and message correlator 406 receive and examine message (1) 502 and message (2) 522. The message correlator of agent 404 extracts correlation keys from each of the messages and forms associations in a fashion similar to that exemplified in FIG. 3. In this case, consider that there is no transaction ID in memory 410 of FIG. 4A for identifying a correlation group as a data structure. The message correlator then will allocate a portion of memory 410 to form a data structure, such as look-up table ("LUT") 550 of FIG. 5, to populate with information, according to an embodiment of the present invention.

LUT 550 is identified by transaction ID "X," which is stored in field 552. The structure of LUT 550 associates the transaction ID of field 552 to fields 558 and 560, which are fields for storing messages (or pointers to messages) and correlation keys ("keys"), respectively. Further, records 554 and 556 associate each message in one of fields 558 to one or more correlation keys in a corresponding field 560. Consequently, when the message correlator stores the correlation key "OrderNumber" for messages (1) 502 and (2) 522 in fields 560, this key will be associated to transaction ID "X" of field 552 as well as to messages "SubmitOrder" and "ShipOrder" of fields 558. So during the OP transaction, but before a terminator has been discovered, these associations persist for linking messages (and their contents) to form a pool of information for this OP transaction. As will be discussed below, this information can be mined for error correction and/or reporting functions.

Figure 6:
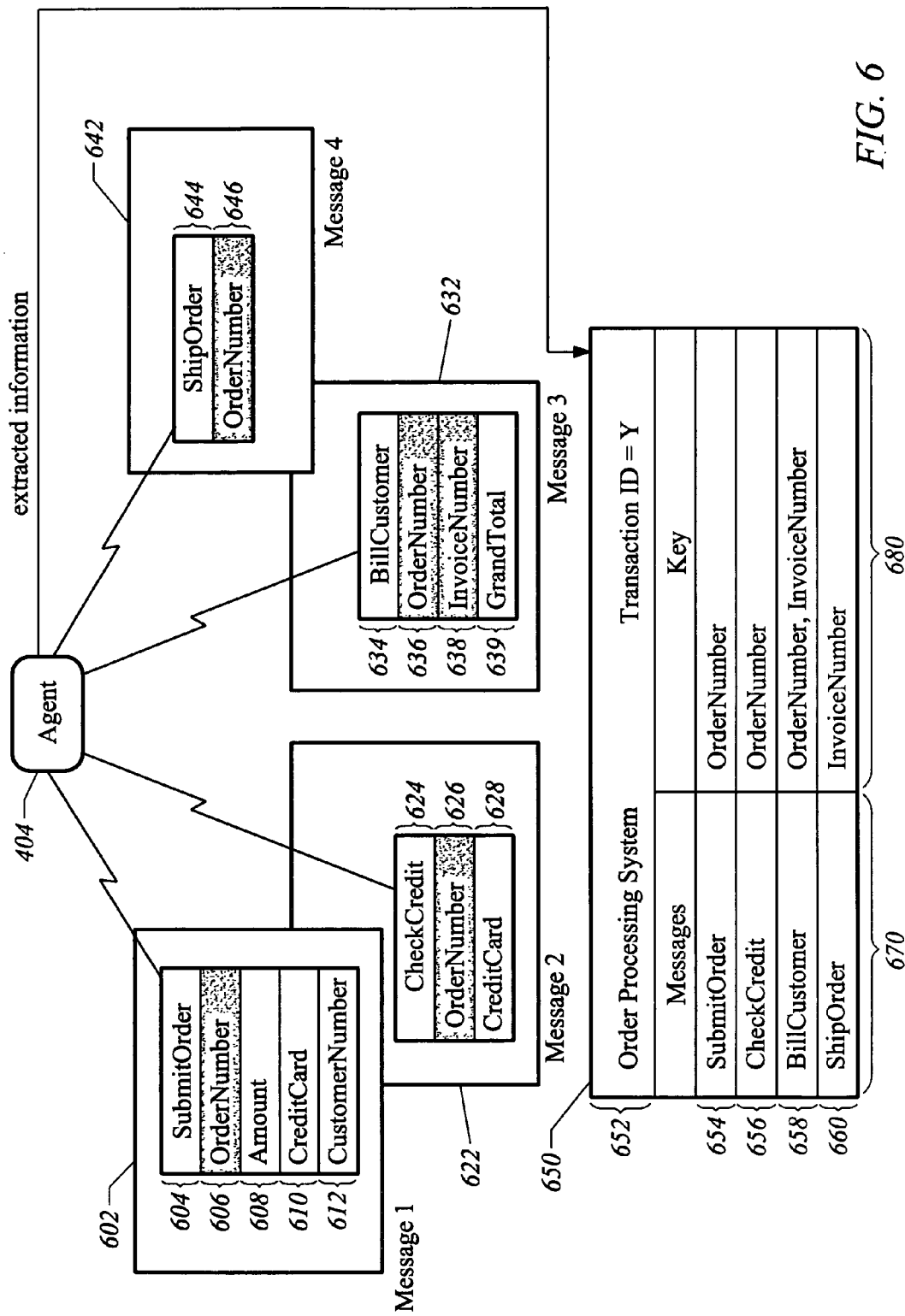
FIG. 6 illustrates an exemplary agent configured to examine and correlate messages containing multiple correlation keys, according to an embodiment of the present invention.

FIG. 6 illustrates an exemplary agent configured to examine and correlate messages containing multiple correlation keys, according to an embodiment of the present invention. Further to the example described in FIG. 5, consider that the order processing system of FIG. 4A uses four messages to effectuate an OP transaction, such as message (1) 602, message (2) 622, message (3) 632, and message (4) 642. Similar to message (1) 502 of FIG. 5, message (1) 602 includes information for starting the OP transaction described in FIG. 6, and includes "SubmitOrder" as operation ID 604 and fields 606 to 612. Fields 606, 608, 610 and 612 contain information similar to that of message (1) 502, where field 606 is a correlation field (shown as the shaded field). In operation, a web browser generates and sends message (1) 602 to Order Processing WS 422 of FIG. 4A (or FIG. 4B) to begin the process of placing an order. Order Processing WS 422 then operates to collate billing information, which can cause agent 404 to issue message (2) 622 to a third-party organization (e.g., financial institution). Credit Check WS 424 of FIG. 4A is a web service that can verify the worthiness of credit card number.

Message (2) 622 includes information for performing the credit check of the OP transaction, such as the order number and the credit card number. As shown, message (2) 622 includes "CreditCard" as operation ID 624, as well as order number and credit card information in respective fields 626 and 628. In this case, the message correlator determines that field 626 contains a single correlation key, and thus is a correlation field. In this OP transaction, Credit Check WS 424 generates a response message indicating that the credit card number has been verified. Then, the order processing system of FIG. 4A (or FIG. 4B) causes agent 404 (or one of agents 454) to issue message (3) 632 to Bill Customer WS 426 for billing the customer. Bill Customer WS 426 will then generate a billing statement (e.g., electronic, printed hardcopy, etc.), and will arrange to deliver the bill to the purchaser.

Message (3) 632 includes information for performing the billing operation of the OP transaction. As shown, message (3) 632 includes "BillCustomer" as operation ID 634, as well as order number, invoice number and grand total information in respective fields 636, 638 and 639. Unlike messages 602 and 622, the message correlator this time determines that message (3) 632 contains two correlation keys rather than just one, the two correlation keys residing in correlation fields 636 and 638. As such, message (3) 632 can be a bridge message to link messages 602 and 622 with any other messages that have only "invoice number" as a correlation key. The last message, message (4) 642, includes the information for shipping the order. As shown, message (4) 642 includes "ShipOrder" as operation ID 644, as well as invoice number information in field 646. Message correlator will determine that message (4) 642 contains only one correlation key (i.e., "InvoiceNumber") in correlation field 646, and that correlation key is a different key from that in messages 602 and 622. The OP transaction is fulfilled when Ship Order WS 428 performs a process that causes the product to ship from a warehouse to the customer.

Agent 404 operates to receive and examine messages 602, 622, 632, and 642 for determining whether these messages can be correlated. The message correlator of agent 404 of FIG. 6 can extract correlation keys from each of the messages to form associations in a fashion similarly described in either FIG. 4A or FIG. 4B, or both. Further, the message correlator can also populate LUT 650 of FIG. 6 with information for correlating messages. Field 652 includes a transaction ID of "Y," which identifies the pending transaction and associates messages and multiple correlation keys ("keys") of respective fields 670 and 680. The structure of LUT 650 is such that records 654, 656, 658, and 660 each associate a message in one of fields 670 with one or more correlation keys stored in corresponding field 680. Thus, both correlation keys "OrderNumber" and "InvoiceNumber" are used to link the messages associated with transaction ID "Y."

The above discussion of the messages of FIG. 6 describes the examination of the messages as if the messages were received in chronological order. That is, the "SubmitOrder" operation message was received first, and then followed sequentially by messages from the "CheckCredit," "BillCustomer" and "ShipOrder." But this need not be the case; any message of any operation can be received at any time according to the present invention. For example, messages (3) 632 and (4) 642 need not depend on each other, and thus can be received at agent 404 independently. Whether a customer is billed before or after a product is shipped is not relevant in this example. Therefore, smaller correlation groups that can potentially link together may not be able to do so until the bridge message arrives.

Figure 7A:
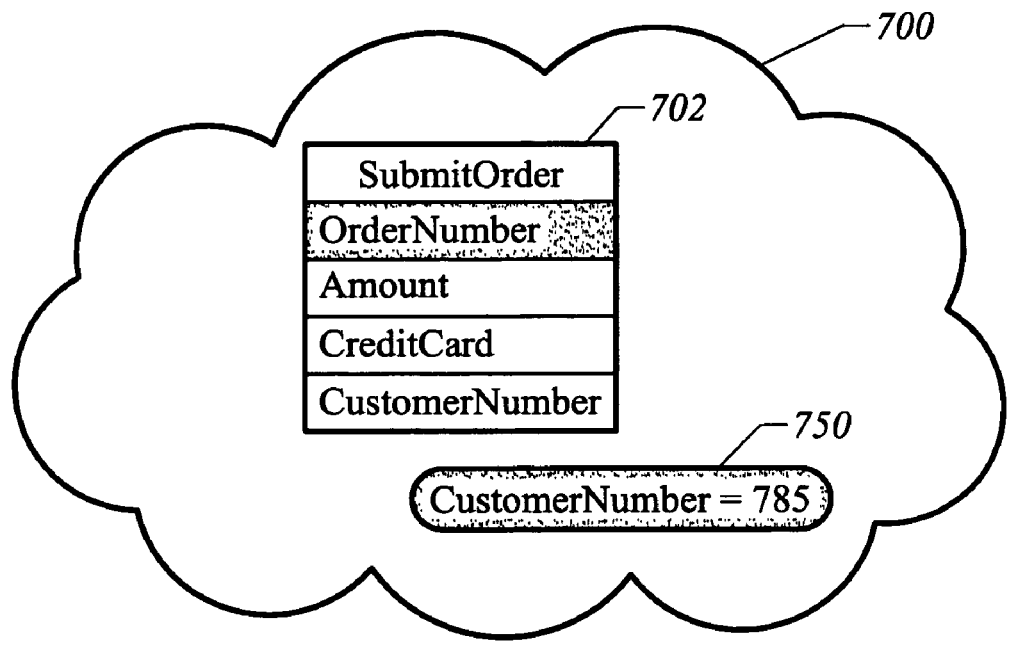
FIGS. 7A-7D depict the formation of an exemplary correlation group using a bridge message, according to an embodiment of the present invention.

FIGS. 7A-7D depict the use of a bridge message to form an exemplary correlation group, according to an embodiment of the present invention. In FIG. 7A, message 702 is received and examined by agent 404 (or any one of agents 454) of FIG. 4A (or FIG. 4B) before any other messages of the pending transaction. As such, message 702 and its contents are associated to a specific correlation key; that is, message 702 is associated with correlation group 700, which can be indexed by its specific correlation key, "785." This number represents a specific value of "OrderNumber" that distinguishes this transaction (and SubmitOrder operation) from other transactions and their messages.

Figure 7B:
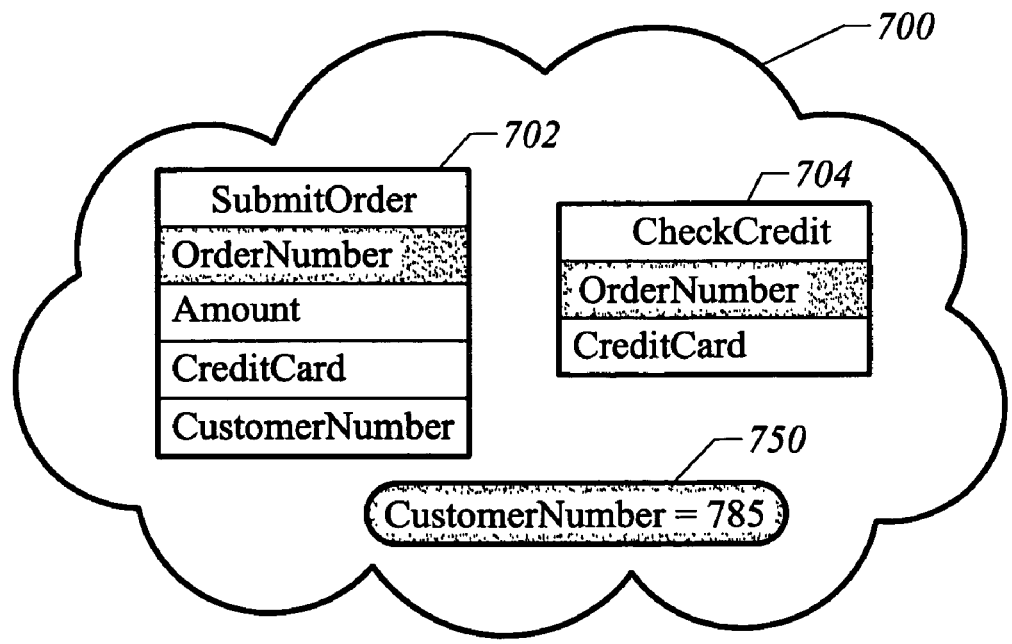
Figure 7C:
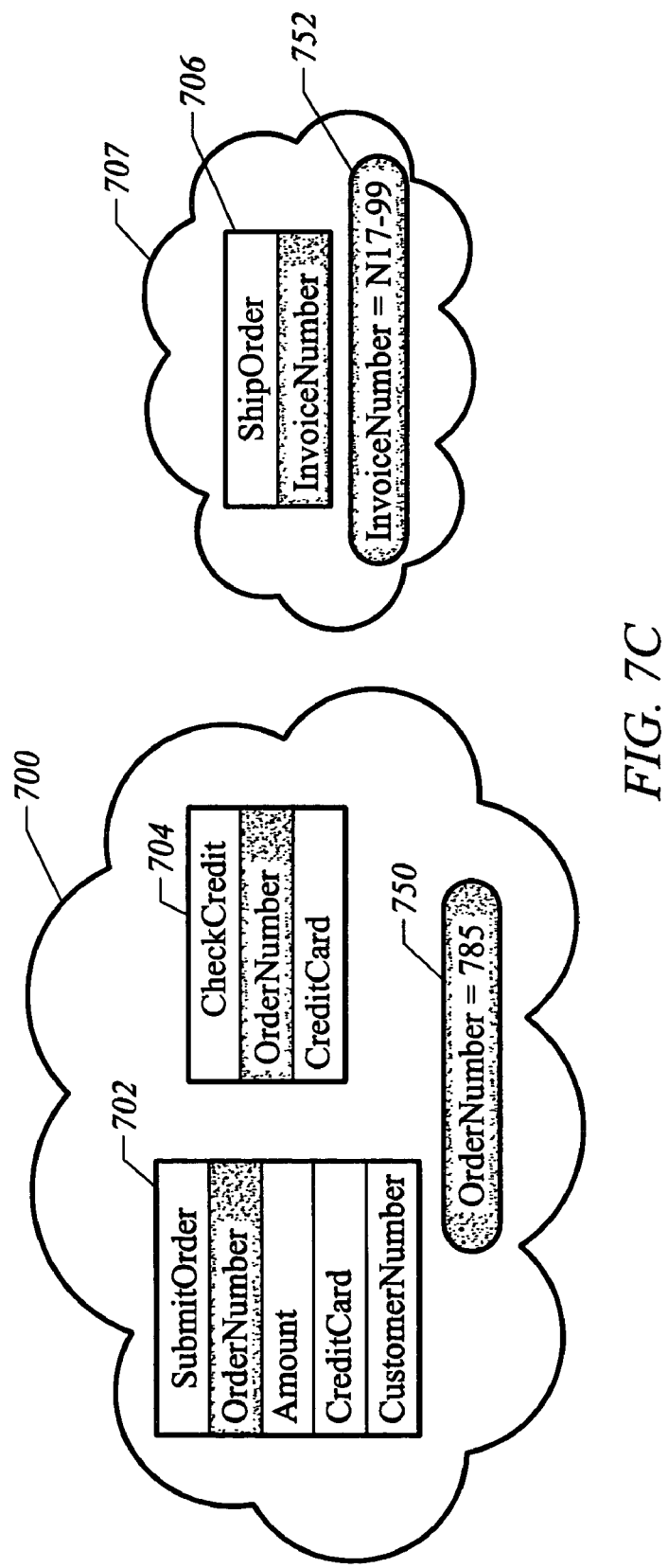

FIG. 7B shows correlation group 700 growing to include the next received message 704, which also is associated and indexed by the OrderNumber value of 785. But in FIG. 7C, the next received message 706 contains only one correlation key. And that key is different than the currently stored correlation key associations. Therefore, this message will be included in another formed correlation group 707 and indexed by the specific correlation key, "N17-99," which is the invoice number for the pending transaction. The formation of correlation group 707 can be (but need not be) governed by flow 300 of FIG. 3. For example, consider that during the examination of message 706 at 312 (FIG. 3) by the agent, the correlation key "785" found stored in memory did not match that of message 706. Thus, an association would have been formed at 314 between the newly discovered correlation key, "N17-99" and the pending transaction ID. And since there are no other correlation keys in message 706, correlation group 707 would be formed at block 326 without including messages 702 and 704. So, correlation groups 700 and 707 formed as separate islands of information.

Figure 7D:
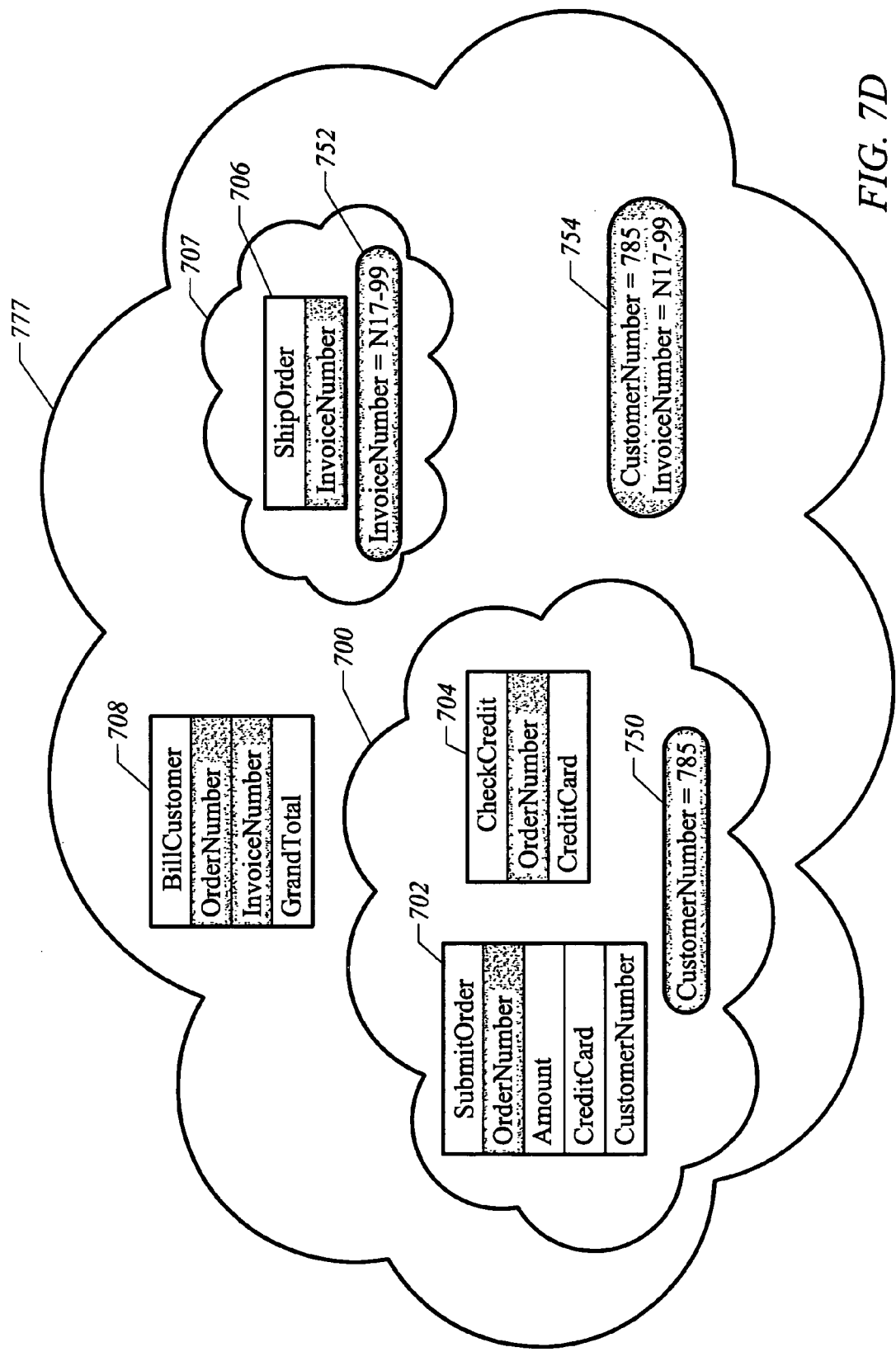

FIG. 7D shows a larger correlation group formed by receiving a bridge message 708. With the two correlation keys of bridge message 708, correlation group 777 can be formed by linking correlation groups 700 and 707 and their messages together. Since either correlation key can identify correlation group 777, a combined correlation key 754 of "785 or N17-99" can be created as an index for identifying the pooled messages. Any later received messages will be linked to correlation group 777 by the union of correlation keys 750 and 752. As such, any of the contents of any of the messages of correlation group 777 can be identified by correlation key 754. These linked messages form a pool of information that provide a "context" for the pending transaction such that the contents of these messages are available to, for example, detect and correct exceptions (e.g., errors, or any other unusual or interesting condition relating to the contents or the processing thereof) in one or more messages used to perform a transaction. This combined correlation key is useful in error correction and reporting functions, as is discussed next.

Figure 8A:
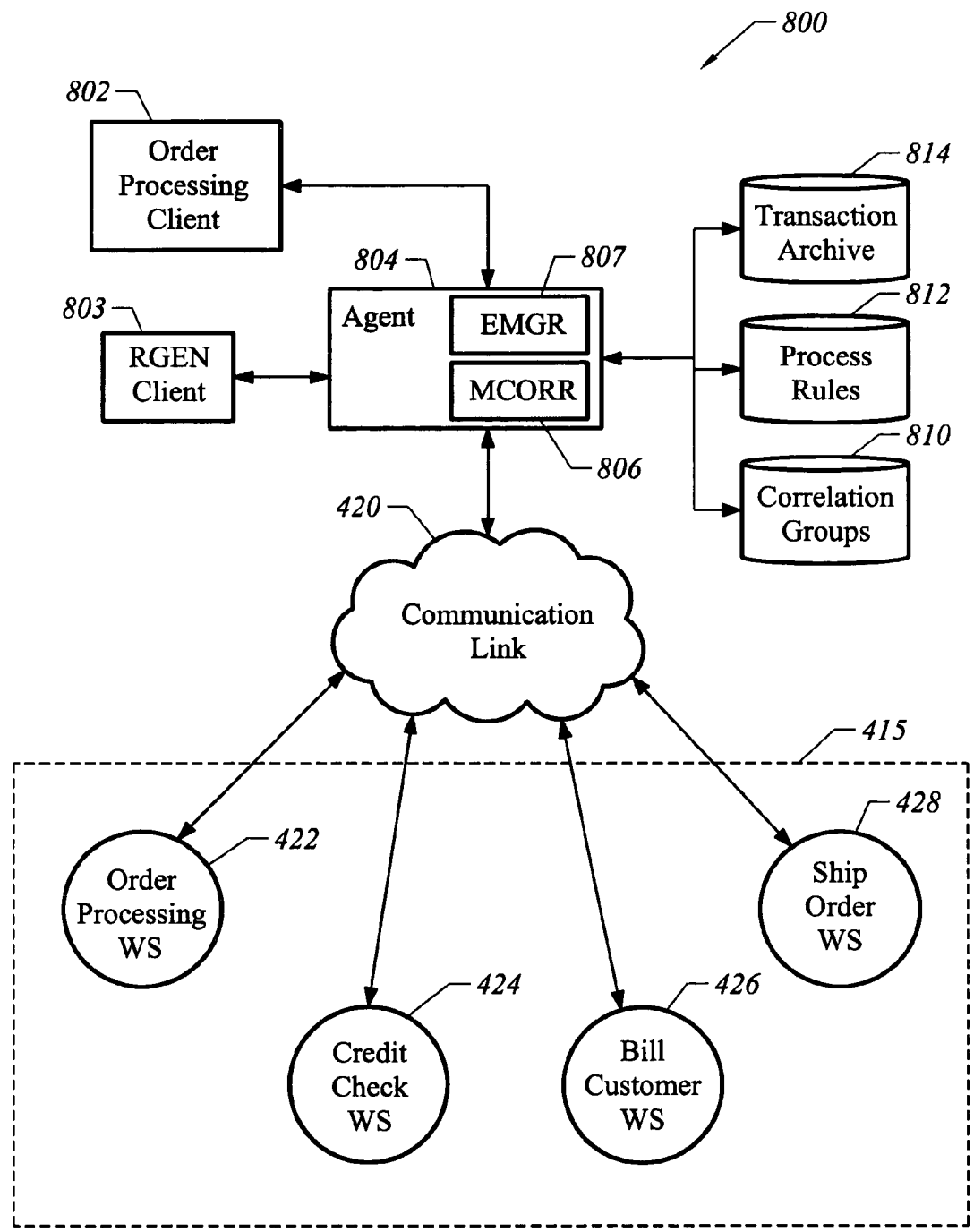
FIG. 8A is a diagram of yet another exemplary web service architecture in accordance with an embodiment of the present invention.

FIG. 8A is a diagram of yet another exemplary web service architecture in accordance with an embodiment of the present invention. For illustrative purposes, consider that web architecture 800 is implemented as a variant of the order processing system described in FIG. 4A. In this example, a report generator ("RGEN") client 803 is coupled to agent 804 to monitor and report on the operation of web architecture 800. Message web service client 802, correlator 806, and memory 810 can be equivalent in functionality and structure as those similarly named in either FIG. 4A or FIG. 4B, or both. Agent 804, however, includes an exception manager ("EMGR") 807 for detecting and correcting problems, such as those that affect web service messages facilitating business processes or transactions, by intercepting and correcting errors in messages before those messages are sent from agent 804 to their destinations. A suitable exception manager for implementing EMGR 807, according to a specific embodiment of the present invention, is an AmberPoint Exception Manager™ developed by AmberPoint, Inc. of Oakland, Calif.

Agent 804 is coupled to two additional memories (e.g., databases or otherwise), memories 812 and 814. Memory ("transaction archive") 814 stores transaction archive information, and memory ("transaction processing rules") 812 stores transaction processing rules that govern, among other things, how to address exceptions arising during transactions. Transaction archives include information previously correlated in previous transactions that are no longer pending. This archived information therefore can be used to modify messages to correct exceptions, such as informational deficiencies. By contrast, the transaction processing rules define the characteristics of messages such that a deviation from those characteristics would be deemed an exception. These transaction processing rules can also define the steps necessary to modify deficient messages so as to correct them before being sent. Similar to agent 404, agent 804 is coupled via a communications link 420 (e.g., a network, a bus, or any other conduit for exchanging messages) to web services 415, such as Order Processing web service ("WS") 422, Credit Check WS 424, Bill Customer WS 426, and Ship Order WS 428, all of which can operate equivalently to similarly named elements of web architecture 400 of FIGS. 4A and 4B.

According to one embodiment of the present invention, RGEN client 803 is a computing device operating to electrically interact with agent 804 to monitor and to report on the real-time functionality of web architecture 800. RGEN client 803 is configured to extract information from, for example, memory 810 by identifying pools of information using either correlation keys or transaction Ds, or both. As such, the performance of web architecture 800 can be monitored at higher-levels of business activities, such as at the transaction level rather than just at the operation level (i.e., component parts level, such as SubmitOrder and ShipOrder levels). This way, an executive or business analyst can employ RGEN client 803 to generate reports for transactions without the intervention of skilled computer programmers. Since message correlation ("MCORR") 806 can correlate messages at a higher level (i.e., less atomic level), performance characteristics can be reported as "units of business activity," which is more meaningful to managers and business analysts. Examples of such a unit of business activity is "sales processed per unit time" or "elapsed time per processed order" (for quality of service information), both of which can be derived from the pool of information.

According to another embodiment of the present invention, EMGR 807 and agent 804 operate to intercept web service messages and determine the transactions to which those messages belong. Also, EMGR 807 holds any messages that fail to comply with the process defined in memory 812. The messages that are held typically contain errors or other anomalous conditions (e.g., content of a message that is out of context) that originate as a result of processing a message by agent 804. In turn, agent 804 can augment or supplant the information of deficient messages with rehabilitative information that corrects the error or ameliorates the anomalous conditions. Upon detecting a noncompliant message, EMGR 807 can seek out rehabilitative information with which to modify the message and place it in compliance with the transaction processing rules. This rehabilitative information can come from the same correlation group with which the noncompliant messages are correlated. Or, the rehabilitative information can come from memory 814, which contains archived transactions. Therefore, EMGR 807 can correct web service messages before they emerge from agent 804 as incorrect or inconsistent messages. Because EMGR 807 uses correlation groups to quickly retrieve rehabilitative information, business process errors can be fixed without having to modify the original code that implements the transaction. In some embodiments, EMGR 807 can be operatively disposed within a dedicated server separate than the computing device supporting functionality of agent 804.

As an example, consider that a SubmitOrder message is missing a credit card number in a required field. Based on a CustomerNumber, EMGR 807 can operate to acquire the credit card number from a previous order that can be stored as a transaction archive of memory 814. Typically, the transaction processing rules will instruct EMGR 807 to first search for the credit card number in a correlation group before searching in memory 814.

Although the functionality of EMGR 807 can be designed into the original code, in many cases an organization would like to examine messages for unusual conditions after the system has been deployed into production, and without rewriting the original code. For example, consider that an organization would like to give all its premium customers free shipping for a month, and would like to implement this in an already deployed web service architecture. According to the present invention, the web service architecture need not be changed or redeployed.

To implement free shipping, EMGR 807 is configured inspect messages for certain customer numbers belonging to the premium customers, as defined by the transaction processing rules. When those customer numbers are detected, the messages are intercepted. When intercepted, the messages relating to the BillCustomer operation are modified to "zero out" shipping charges even before those messages exits agent 804 to generate a billing statement at a Bill Customer web service.

In the event that the web service message BillCustomer does not include information describing the customer number, EMGR 807 can seek out the customer number from the pool of information with which the BillCustomer message belongs. That is, the transaction processing rules can be defined to instruct EMGR 807 to retrieve the customer number from the correlation group. In practice, EMGR 807 can inspect a SubmitOrder message that is associated with the BillCustomer to acquire the customer number. Therefore, a correlation group of an embodiment of the present invention can be used to provide information to modify messages before they exit agent 804, where such a modification is either to correct message information or to modify behavior of the transaction itself, such as illustrated above by the zero-out implementation.

Figure 8B:
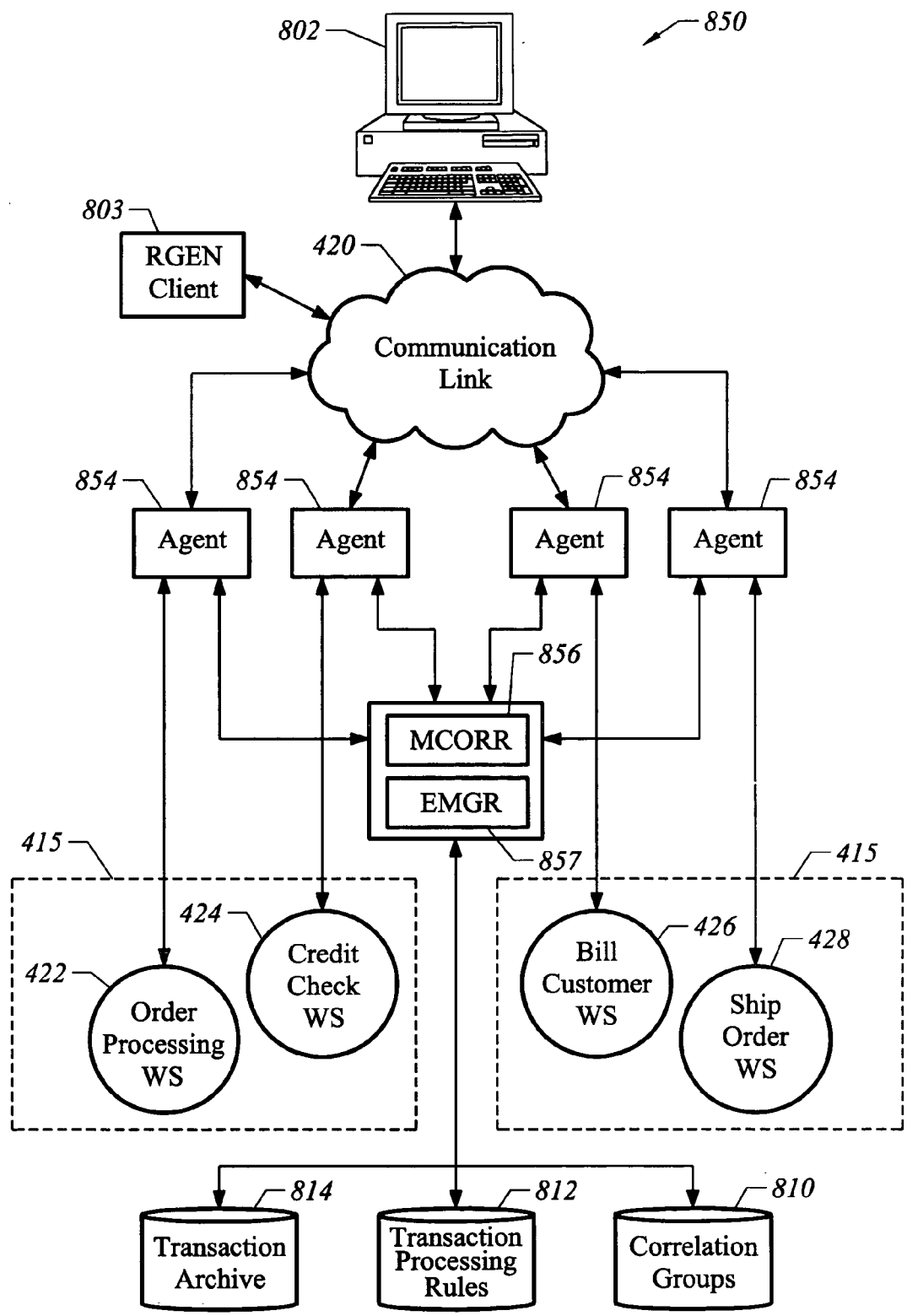
FIG. 8B is a diagram of still yet another exemplary web service architecture, which includes one or more distributed agents in accordance with an embodiment of the present invention.

FIG. 8B is a diagram of another exemplary web service architecture 850 in accordance with as specific embodiment of the present invention. As shown, agents 854 of FIG. 8B are disposed between communications link 420 and each of web services 415, similar to the architecture described in FIG. 4B. But as shown, the functionality and structure of both MCORR 856 and EMGR 857 of FIG. 8B are separate from, but common to agents 854. In this configuration, MCORR 856 and EMGR 857 both are configured to access each of transaction archive 814, transaction processing rules 812, and correlation groups 810.

In this example, EMGR 857 is configured to instruct agents 854 to look for messages having a particular condition, and if found, the agent detecting that condition is to inform the EMGR 857 of the detection. Upon receiving an indication from one of agents 854 that a condition exists, EMGR 857 can instruct MCORR 856 to form a correlation group 810 (or access an existing one) that contains information gathered from either message content or message context, or both. From this, EMGR 857 can more readily assess whether the condition is appropriate or not. For example, consider that a rule in transaction processing rules 812 states: "If platinum customer orders an item, then do not back-order," with an action of "fulfill platinum order first before any other order." To determine whether back-ordering an order is appropriate or not, EMGR 857 instructs MCORR 856 to build a correlation group including the identify of customers (i.e., platinum or not) as a context for those types of messages. Using the relevant one of correlation groups 810, EMGR 807 can prohibit agents 854 from conveying messages to web services 415 that would otherwise cause a platinum customer's order to be back-ordered. But note that messages for orders of non-platinum customers need not be intercepted, and as such, their messages will pass through agents 854 unhindered. This means that orders of non-platinum customers can be back-ordered.

The various methods of correlating messages, as described above, can be governed by software processes, and can be implemented as part of an algorithm governing the operation of either an agent or a message correlator, or both. Or, an algorithm can govern the operation of an exception manager as well.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of non-transitory computer-readable storage media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, C#, or any other programming language and/or development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer-readable storage media to direct a computer to perform a transaction using at least one web service, comprising:

an autonomous software agent comprising instructions configured to associate a first plurality of messages with a first correlation key corresponding to a common field and common value shared by the first plurality of messages, wherein the first plurality of messages is directed to at least two different web service operations;

associate a second plurality of messages with a second correlation key corresponding to a common field and common value shared by the second plurality of messages, wherein the second plurality of messages is directed to at least two different web service operations;

link the first and the second plurality of messages such that the contents of each of the first and the second plurality of messages from a pool of information linked by common correlation keys intercept a message with deficient information; and modify the message to include information from the pool of information such that the message includes information from another message associated with the pool of information, wherein the information places the message in compliance with web service transaction processing rules.

2. The non-transitory computer-readable storage media of claim 1 wherein the instructions to link the first and the second plurality of messages further comprise instructions to receive a bridge message including the first and the second correlation keys.

3. The non-transitory computer-readable storage media of claim 1 wherein the instructions to modify the message further comprise instructions to locate the information from another message in a transaction archive including a prior pool of information.

4. The non-transitory computer-readable storage media of claim 1 wherein correlated messages are encoded in accordance with simple object access protocol (SOAP).

5. The non-transitory computer-readable storage media of claim 1 wherein the autonomous software agent further comprises instructions configured to send the message to execute the transaction.

* * * * *